Patented Feb. 13, 1923.

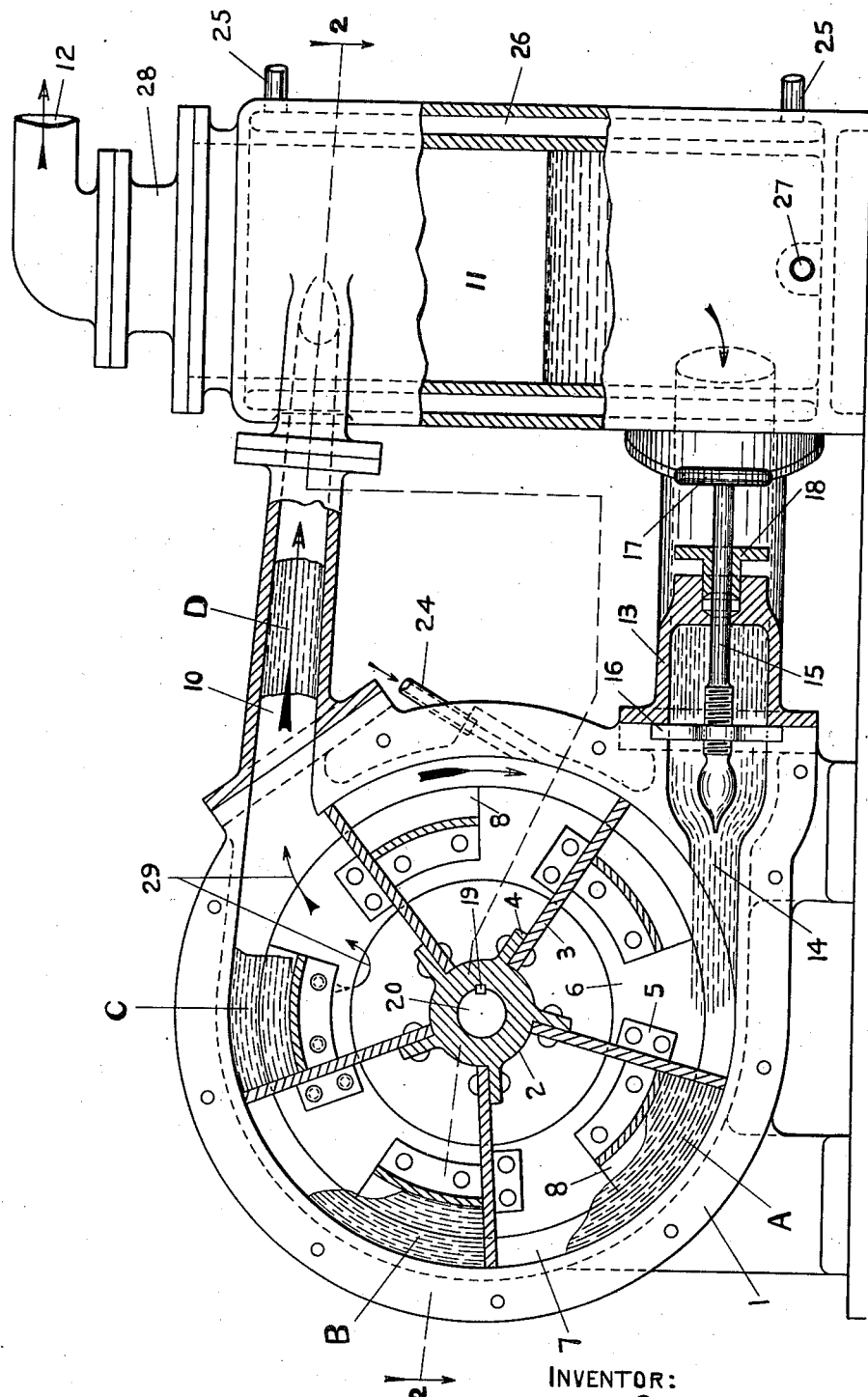

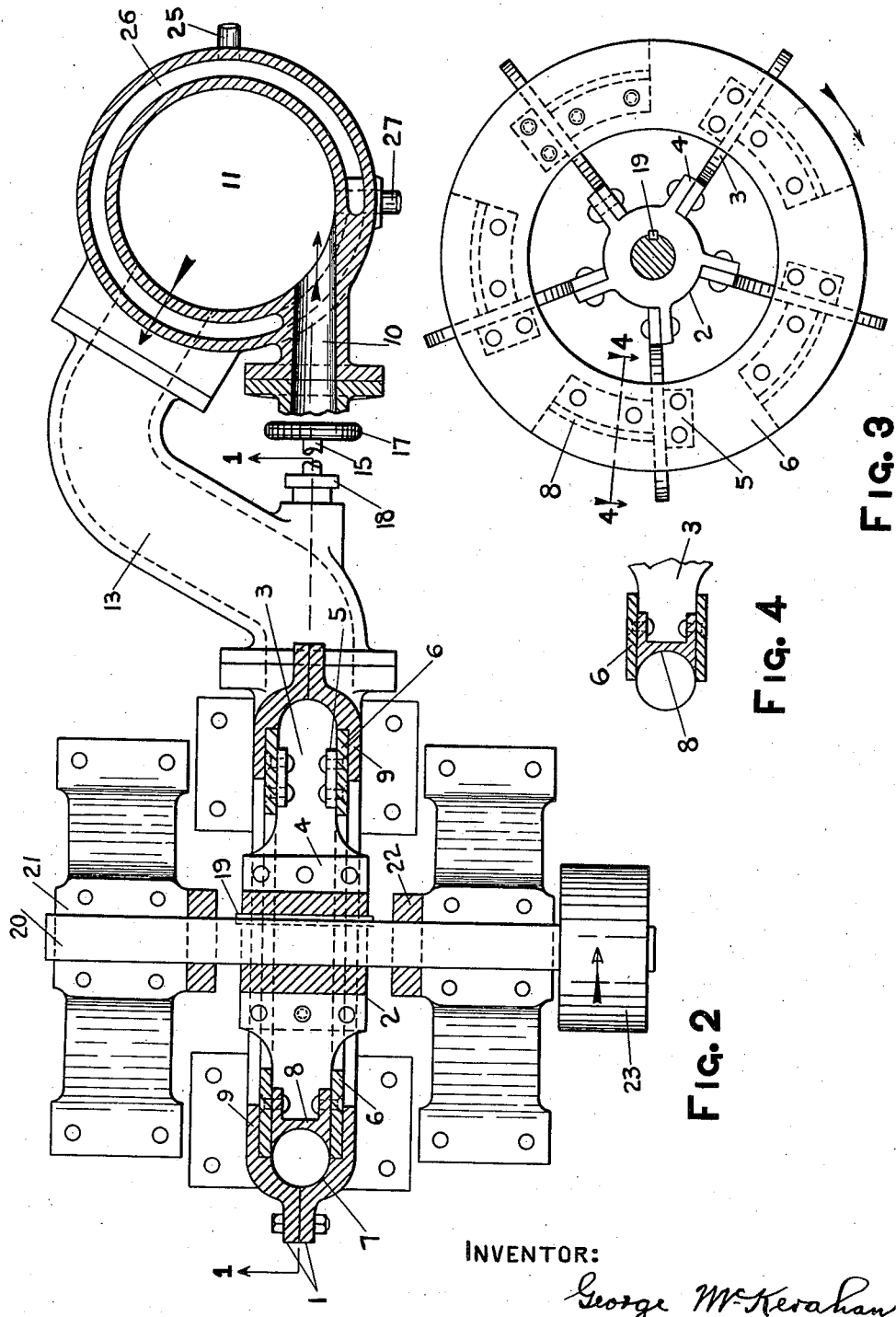

1,445,096

UNITED STATES PATENT OFFICE.

GEORGE McKERAHAN, OF PITTSBURGH, PENNSYLVANIA.

ROTARY HYDRAULIC AIR COMPRESSOR.

Application filed August 6, 1921. Serial No. 490,343.

*To all whom it may concern:*

Be it known that I, GEORGE McKERAHAN, a citizen of the United States, residing at Pittsburgh, in the county of Allegheny and State of Pennsylvania, have invented new and useful Improvements in Rotary Hydraulic Air Compressors, of which the following is a specification.

My invention relates to air compressors in which the immediate compressing agent is water to which a high velocity has been given by a mechanically rotated impeller and my objects are to provide a compressor of this type which will be competent for high air pressures and which will utilize more effectively the energy of the impelled water. These results are obtained by avoiding the mixing of the water and air charges and by detaching from the body of the inflowing water supply, distinct, separated portions which may be formed into water pistons of a shape to fit the air compression tube into which they are hurled, the air charges being delivered to the compression tube alternately with the water pistons. By this method the piston action of the water is made more precise and effective and the unobstructed space between the successive water pistons freely admits an adequate air charge the volume of which can be definitely regulated. A further object is to deliver the water supply to the impeller in such manner as will most effectively utilize any initial velocity which the water may bring from its source. My improvements are especially applicable to that type of rotary compressor wherein the water pressure from the receiving vessel is returned to the impeller. The accompanying drawings illustrate the mechanism.

Fig. 1 is a vertical view taken on the lines 1—1 of Fig. 2. In this view the near half of the stationary casing is removed showing the impeller wheel and water supply nozzle in central section; part sections of the air compression tube and the receiving vessel are also shown.

Fig. 2 shows a generally horizontal section on the lines 2—2 of Fig. 1.

Fig. 3 is a side view of the impeller wheel removed from its casing both sides being alike, and Fig. 4 is a section through this wheel on the line 4—4 of Fig. 3. Identical numbers refer to the same parts throughout the several views.

A stationary casing 1 contains the rotatable impeller wheel 2 which has impeller blades 3 secured to ribs 4 of the wheel hub. Flange pieces 5 forming parts of impeller blades 3 serve to connect the latter to ring side plates 6 between which the impeller blades extend. The interior of stationary casing 1 is formed into an annular channel 7 which is semi-circular in cross section as shown in Fig. 2. This channel forms an annular half cylinder concentric with the impeller wheel. Water piston formers 8 are fitted between ring side plates 6, of the impeller wheel, to which they are fastened. They are placed immediately in front of impeller blades 3, in the direction of rotation, and occupy only a part of the sector between blades, the remaining forward part forming a passage for the air charge which is centrifugally fed to air compression tube 10. The outer faces of part water piston formers 8 are circular half cylinders their axis concentric with the impeller wheel and they are of the same diameter as the annular half cylinder 7 of the stationary casing described above.

The part piston formers 8 and the annular half cylinder 7 are complemental to each other having a common axis and together they form circular cylinders in which the water pistons are molded in the manner hereafter described. The front ends of these cylindrical water piston chambers, in the direction of rotation, are open while their rear ends are closed. In the construction shown the rear end closure is effected by the forward faces of the impeller blades 3 against which part piston formers 8 abut in water tight joints.

A convex semi-circular end of the impeller blade accurately fits and revolves in annular half cylinder 7 thus completing the rear end closure of the water piston chamber. This projecting cylinder end is shown clearly in Fig. 4.

The sides 9 of casing 1 overlap the rim of the impeller wheel a distance sufficient to prevent water from the piston chambers being forced out by centrifugal pressure.

To reduce leakage the impeller blade ends and the peripheries and sides of ring side plates 6 will fit casing 1 as closely as may be possible without injurious friction.

A cylindrical air compression tube 10 opens from the interior of casing 1. This compression tube may have a diameter equal to the diameter of the water piston chambers or the tube's diameter may be a little less thus insuring a closer fit of the water piston. This latter object may be further promoted by making a slight and constant reduction in the tube's diameter as it approaches the receiving chamber.

The axis of compression tube 10 forms a tangent to the circular axis of the water piston chambers and the tube discharges into a receiving vessel 11 wherein the air and water are separated and the compressed air conveyed away through pipe 12. Water supply nozzle 14 may be connected to any original source which has sufficient pressure to feed the water to the impeller, a low speed of the supply flow being compensated for by increasing the area of nozzle 14.

But a reduction of the power required to drive the impeller will be obtained if the discharge water from receiving vessel 11 is returned to nozzle 14 through a pipe 13 as shown in the drawings, this water being delivered to the impeller with considerable velocity as a result of the air pressure in vessel 11. When the water is supplied from an original source the pressure discharge water from vessel 11 may be utilized for other purposes. In this mode of operation the cooling water jacket on vessel 11 will not be needed and the effectiveness of the compressor's action will be in no degree impaired.

It will be noted that the water is fed circumferentially and tangentially to the periphery of the impeller through nozzle 14 in a direct manner which fully utilizes the entering velocity of the water, the air charges being delivered centrifugally through the interior of the impeller wheel as already described. A needle 15, internally threaded support 16, operating wheel 17, and packing box 18 constitute a device for regulating the water intake. By varying the water supply the length and mass of the water pistons may be increased or diminished and flexibility of performance thus obtained for different speeds and air pressures. Where this flexibility is not desired the regulating needle 15 and its related parts may be omitted and a fixed size of nozzle used to suit the requirements. A key 19 secures the impeller wheel to its shaft 20 which rotates in bearings 21. Collars 22 fixed to the shaft limit endwise motion of the latter. The compressor is well suited for direct motor drive or it may be driven by a belt on pulley 23. Some of the water will be absorbed and carried off by the compressed air and when the water return system is used the water thus lost from the circuit will be replaced through pipe 24. Pipes 25 convey the circulating water for cooling jacket 26 which, in a water return system, will conduct away the heat imparted to the water by the compressed air. Pipe 27 leading from the interior of vessel 11 will serve to drain the latter when required. Pipes 24, 25 and 27 would have suitable valves.

When the compressed air is delivered from vessel 11 to a pipe system of large volume or to a storage receiver an upward opening check valve may be placed at 28 to prevent a return of the air pressure when the compressor is temporarily stopped.

In operation the compressor will perform as follows:

The water delivered through nozzle 14 having a lower velocity than the impellers a portion of the jet will be cut off by each succeeding impeller which will leave the jet behind and crowd forward upon the water in front as shown at "A" in Fig. 1.

This process in more advanced stage is shown at "B". At "C" the water piston is fully formed and is then hurled into air compression tube 10 upon the air charge which has already been delivered to the compression tube. Travel of the air charge is indicated by small arrows 29, a part of the charge having been carried forward in front of the water piston from "A" and "B". A water piston "D" is shown passing through the compression tube.

It will be seen how that by feeding the water supply directly to the periphery of the impeller wheel, tangentially thereto and in the direction of its travel, the higher velocity of the impellers divides the water into widely separated masses thus permitting, by centrifugal action through the impeller wheel's interior, of the introduction of large bodies of air directly in front of the water pistons, the path of the air until it reaches the compression tube being entirely free from any obstruction by the water or otherwise.

For low air pressures and low impeller speeds and where a high efficiency is not desired the water piston formers 8 may be omitted or their construction simplified.

It is understood that considerable variation may be made in the details of construction without departing from my invention.

If preferred the water piston forming chambers and air compression tube 10 may be made rectangular in cross section instead of circular, the only requirement being that their cross-sectional areas and outlines shall respectively conform somewhat closely.

The compressor may be used for other gases besides air.

The relative proportions of air and water charges may be varied either by varying the water supply at nozzle 14 or by changing the rotation speed of the impeller wheel.

What I claim as new is:

1. In a rotary hydraulic air compressor, a stationary casing; an interior annular channel in said casing; an impeller wheel within the casing having like parts of water piston formers spaced around its periphery and concentric with the wheel, these parts of water piston formers and the aforesaid annular channel being complemental parts of complete water piston forming chambers which are inclosed except as to their forward ends in the direction of rotation; a water inlet through the outer circumference of the stationary casing delivering water to the interior annular channel tangentially to the latter and to the path of the water piston formers; air passages through the interior of the impeller wheel alternating with the aforesaid part water piston formers, these air passages reaching to the annular channel of the stationary casing and leading thence to an air compression tube; an air compression tube opening tangentially from the said annular channel; a receiving vessel connected to the compression tube; and an air conveying pipe and a water dischage pipe leading from the receiving vessel.

2. In a rotary hydraulic air compressor, a stationary casing; an impeller wheel within said casing; a water inlet through the outer circumference of the stationary casing delivering water to the wheel's periphery tangentially to the path of the latter and in the direction of its travel; peripheral impellers on said wheel adapted to cut off, separate and carry forward detached portions of the inflowing water; air passages through the interior of the impeller wheel, said passages leading to the circular spaces in front of the water charged impellers and thence to an air compression tube; an air compression tube opening tangentially from the interior of the stationary casing; a receiving vessel connected to the compression tube; and an air conveying pipe and a water discharge pipe leading from the receiving vessel.

GEORGE McKERAHAN.